(12) United States Patent
Nott

(10) Patent No.: X7644
(45) Date of Patent: Jun. 29, 1833

(54) STOVES, ANTHRACITE, COAL

(76) Inventor: Eliphalet Nott

United States Patent
Patent No.: X7644
X7644
E. NOTT.
Gas Furnace.
Patented June 29, 1833.
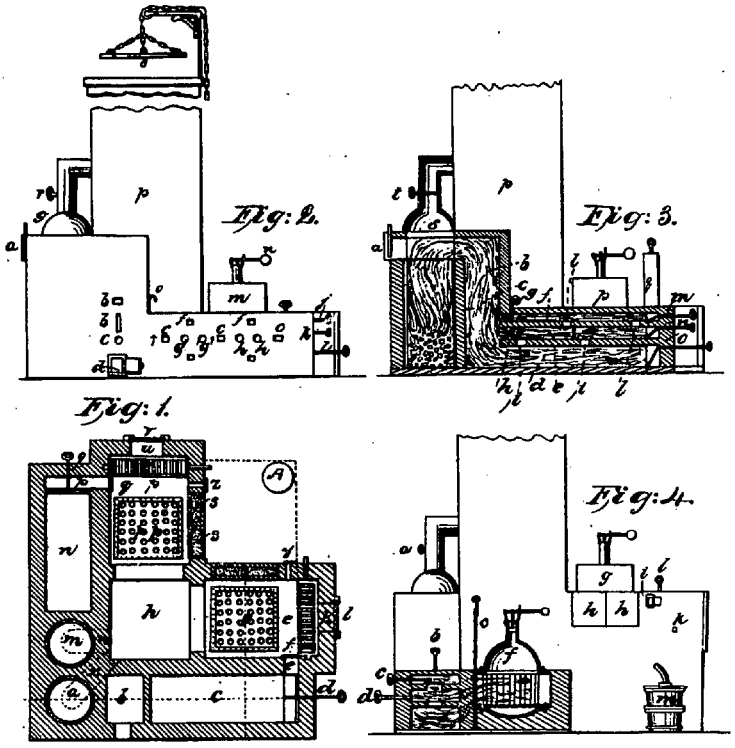
E. PETERS, Photo-Lithographer, Washington, D.C.